United States Patent
Lenz et al.

(10) Patent No.: US 6,634,195 B2
(45) Date of Patent: Oct. 21, 2003

(54) LOCKING BUTTON FOR SEMI-TRACTOR PNEUMATICS

(75) Inventors: Randy M. Lenz, Arcadia, IA (US); Jeff M. Grote, Ankeny, IA (US)

(73) Assignee: Neff Co Technologies, Arcadia, IA (US)

( * ) Notice: Subject to any disclaimer, the term of this patent is extended or adjusted under 35 U.S.C. 154(b) by 0 days.

(21) Appl. No.: 09/947,800

(22) Filed: Sep. 6, 2001

(65) Prior Publication Data

US 2003/0041634 A1 Mar. 6, 2003

(51) Int. Cl.$^7$ ................................................ G05G 1/00
(52) U.S. Cl. ............................ 70/178; 70/175; 70/176; 70/179; 70/232
(58) Field of Search ............................ 70/175–180, 232

(56) References Cited

U.S. PATENT DOCUMENTS

| | | | | |
|---|---|---|---|---|
| 1,782,584 A | * | 11/1930 | Ryan ............................ 70/173 |
| 3,625,573 A | * | 12/1971 | Conn ............................ 303/89 |
| 3,998,495 A | * | 12/1976 | Maxwell et al. ............... 303/89 |
| 4,040,675 A | * | 8/1977 | Richmond et al. ............ 303/89 |
| 4,620,428 A | * | 11/1986 | Kopesky ...................... 70/175 |
| 4,633,686 A | * | 1/1987 | Carr ............................ 70/179 |
| 4,697,444 A | * | 10/1987 | Maffey ........................ 70/232 |
| 4,779,433 A | * | 10/1988 | Legare ........................ 70/211 |
| 4,823,568 A | * | 4/1989 | Rogers et al. ................ 70/58 |
| 4,881,388 A | * | 11/1989 | Pruim ......................... 70/175 |
| 4,969,342 A | * | 11/1990 | Marchiori .................... 70/49 |
| 5,074,134 A | * | 12/1991 | Wheadon .................... 70/175 |
| 5,375,916 A | | 12/1994 | Cook |
| 5,688,027 A | | 11/1997 | Johnson |

* cited by examiner

Primary Examiner—Suzanne Dino Barrett
Assistant Examiner—Christopher Boswell
(74) Attorney, Agent, or Firm—McKee, Voorhees & Sease, P.L.C.

(57) ABSTRACT

An anti-theft device for preventing unauthorized release of the air brakes on a vehicle includes a lockable button for the valve stem for the control valve. The lockable button includes a button body, a coupling member, and a lock assembly having a latch member that selectively inserts into an annular groove on the coupling member. The coupling member is secured to move axially with the axially movable valve stem of the air brake control valve. The latch member extends into the annular groove on the coupling member to position the button body so as to limit the axial movement of the valve stem and thereby prevent the release of the air brakes.

20 Claims, 6 Drawing Sheets

LOCKING BUTTON FOR SEMI-TRACTOR PNEUMATICS

BACKGROUND OF THE INVENTION

The present invention relates to the field of devices for locking pneumatic control valves. More particularly, this invention relates to an anti-theft device for preventing the driver controlled air brake valves of a vehicle from being released by an unauthorized person. A lockable button replaces the existing buttons on the control valves to prevent unauthorized release of the air brakes.

Semi-tractors and trailers have air brakes that the driver must release to move the vehicle. For safety reasons, the brakes are automatically applied when there is no counteracting air pressure in the circuit. The control valve for the air brakes usually has a pair of push/pull valve stems for the semi-tractor and trailer respectively. Various devices have been tried for locking the air brake control valve or the brakes themselves. Many of these devices are costly to make and difficult to install or retrofit into a vehicle. Although mechanical devices utilizing a key-lock assembly have been proposed, such devices are unnecessarily bulky, complex, and relatively inflexible in use. Therefore, there is a need for a low-cost simple and effective lockable button device for an air brake control valve on a vehicle.

A primary objective of the present invention is the provision of an improved anti-theft device for use on semi-tractors and trailers.

Another objective of this invention is a provision of an independently lockable button device for each valve stem of an air brake control valve.

A further objective of this invention is the provision of a lockable button device that is compact and replaces the existing button on the valve stem of the air brake control valve.

Another objective of this invention is the provision of a lockable button device that readily adapts to various types of air brake control valves and control valve mounting configurations on a variety of makes and models of vehicles.

A further objective of this invention is the provision of an anti-theft device that is economical to produce, easy to use, durable and reliable in use.

These and other objects will be apparent to those skilled in the art from the drawings, as well as from the description and claims that follow.

BRIEF SUMMARY OF THE INVENTION

An anti-theft device for preventing unauthorized release of the air brakes on a vehicle includes a lockable button for the valve stem for the control valve. The lockable button includes a button body, a coupling member, and a lock assembly having a latch member that selectively inserts into an annular groove on the coupling member. The coupling member is secured to move axially with the axially movable valve stem of the air brake control valve. The latch member extends into the annular groove on the coupling member to position the button body so as to limit the axial movement of the valve stem and thereby prevent the release of the air brakes.

DETAILED DESCRIPTION OF THE PREFERRED EMBODIMENT

Figure 1:
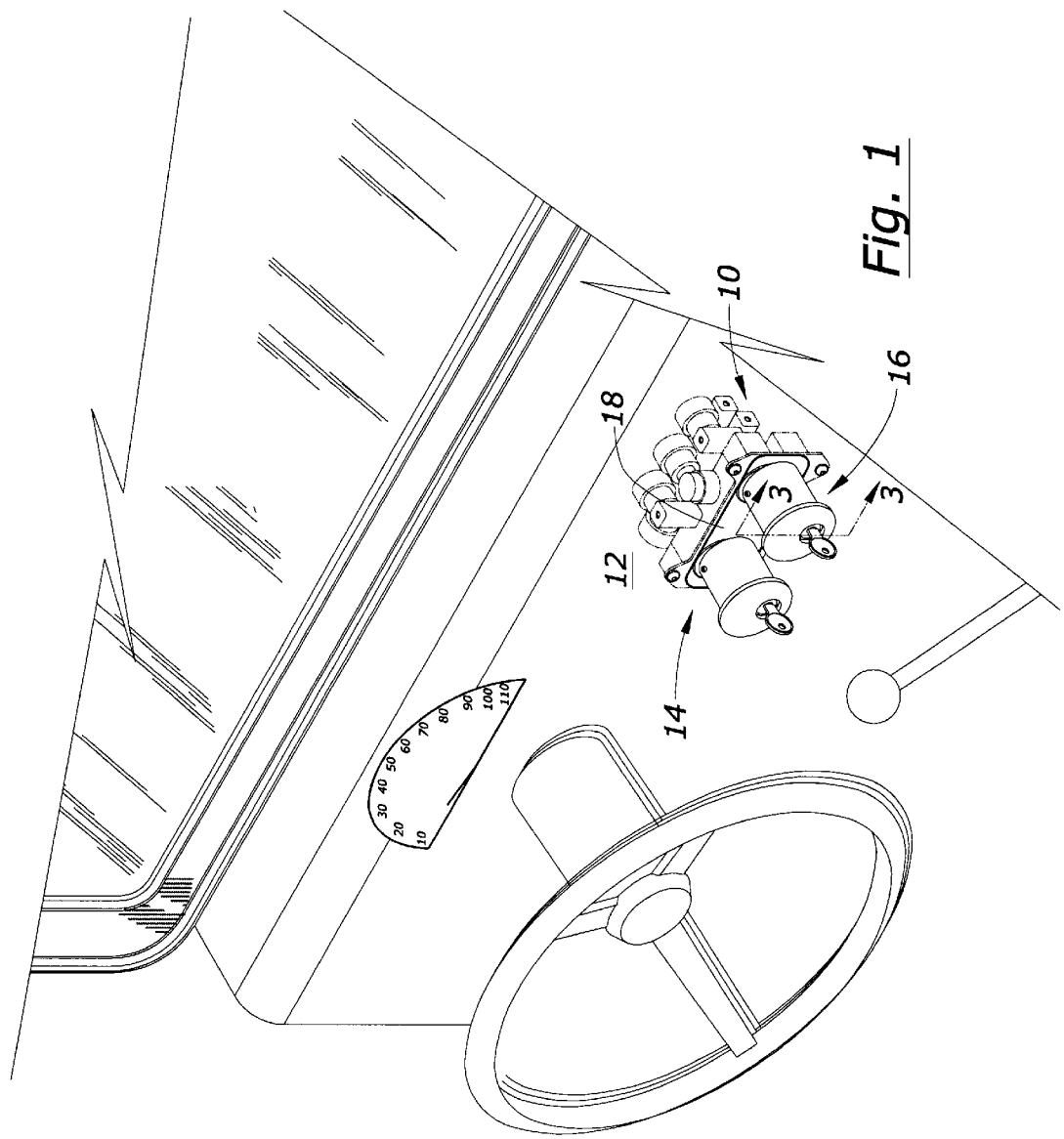
FIG. 1 is a partial perspective view of the interior of a semi-tractor and shows an air brake control valve equipped with two lockable button devices according to the present invention.

FIG. 1 illustrates the interior of a cab of a semi-tractor. As is conventional, a pneumatic control valve 10 mounts on or behind the dashboard 12. The control valve 10 controls the air brakes of the semi-tractor and the trailer pulled by the semi-tractor. The present invention provides a lockable button device that replaces the conventional buttons typically found on the air brake control valve 10. For example, when the air brake control valve 10 controls the pneumatics for the semi-tractor and a trailer attached thereto, independently operatable lockable button devices 14, 16 are mounted on the valve 10 respectively. The lockable button devices 14 and 16 are constructed and applied in a substantially identical manner, and thus only lockable button device 16 is described in further detail below.

Figure 2:
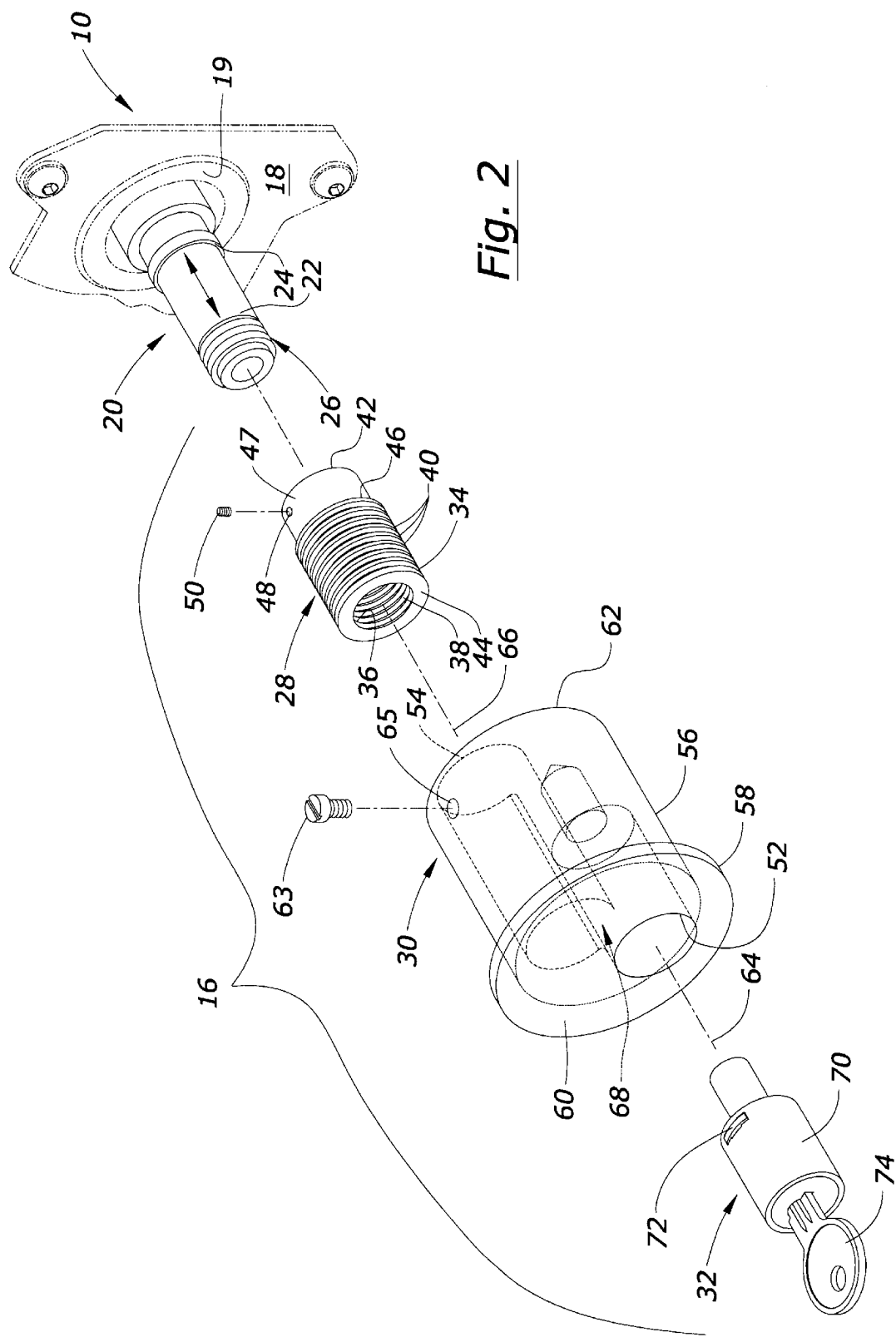
FIG. 2 is an exploded assembly view in perspective of one of the lockable button anti-theft devices shown in FIG. 1.

Referring to FIG. 2, the air brake control valve 10 has a faceplate 18 and an valve stem 20 that is axially movable with respect to the faceplate 18. Although one skilled in the art will appreciate that it is possible to reverse the logic of the control valve 10, the control valve 10 conventionally releases the air brakes when the valve stem 20 moves toward the faceplate 18, a raised circular pad 19 on the faceplate 18, or an intervening dashboard 12. The semi-tractor or trailer can move once the air brakes are released. Otherwise, the air brakes are normally on and prevent movement of the semi-tractor or trailer. Although it may take other forms depending on the design provided by the control valve manufacturer, the valve stem 20 is generally an elongated rod 22 that includes a shoulder 24 thereon and has means 26 thereon forwarded the shoulder 24 for fastening a conventional button thereto. The means 26 is shown as threads in the present application, but could alternatively include a hole for a roll pin, threaded set screw, or other similar structures.

The lockable button device 16 includes a coupling member 28, a button body 30, and a lock assembly 32. The coupling member 28 is preferably a cylindrical hollow tubular sleeve that has an outer diameter 34 defining an outer surface and an inner diameter 36 adapted to receive and be secured by fastening means 38, such as threads, to the valve stem 20 to the brake valve 10. The outer diameter or surface 34 of the coupling member 28 includes a groove 40 thereon. More preferably, the outer diameter 34 includes a plurality of annular grooves 40 longitudinally spaced therealong. The coupling member 28 has opposite forward and rearward ends 42, 44 respectively. The coupling member 28 has a reduced diameter portion 47 adjacent the forward end 42 that forms a shoulder between the forward end 42 and the grooves 40. The fastening means 38 optionally includes a hole 48 extending radially into the inner diameter 36 of the coupling member 28. A pin member 50 can be inserted into the hole so as to engage the valve stem 20. In the preferred embodiment shown, the pin member is a threaded set screw, but a roll pin could also be used if a roll pin hole is provided in the valve stem 20.

The button body 30 has elongated first and second bores 52, 54 therein adapted to receive the lock assembly 32 and the coupling member 28 respectively. The button body includes a substantially cylindrical main body portion 56 and an enlarged head portion 58. The first and second bores 52, 54 are preferably close ended, with the first bore 52 entering at a first end 60 of the body and the second bore 54 entering at a second end 62 of the body. The first bore 52 has a central longitudinal axis 64 that is different from the central longitudinal axis 66 of the second bore. Preferably the central longitudinal axis 64 of the first bore 52 is substantially parallel to the central longitudinal axis 66 of the second bore 54. The button body 30 has an internal cavity 68 that interconnects the first and second bores 52, 54 as shown. Although the internal cavity 68 is shown as a substantially rectangular slot, other shapes will suffice without detracting from the invention.

Figure 3:
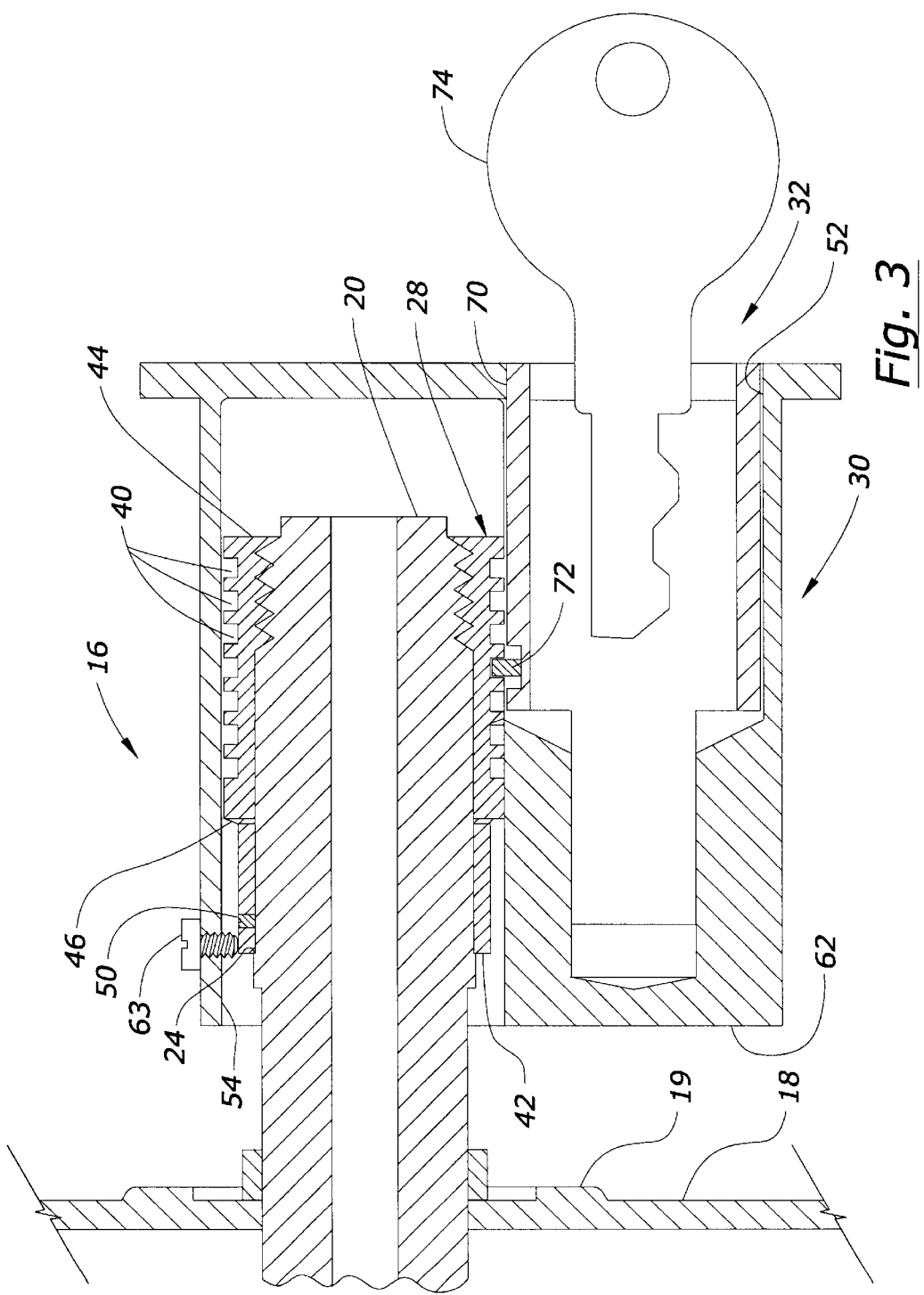
FIG. 3 is a cross-sectional view of the lockable button device taken along line 3—3 in FIG. 1 to show the button device in a regular or normal use position in which the condition of the air brakes can be changed.

The lock assembly 32 is a key lock assembly that includes a substantially cylindrical canister 70 and a latch member 72 that is selectively movable in a transverse direction with respect to the lock canister 70 by turning a key 74. The latch member 72 preferably extends and retracts a radial direction with respect to the lock canister 70. The latch member 72 is elongated and has a substantially rectangular cross section in a transverse plane. As best seen in FIG. 3, the width of the latch member 72 is smaller than the width of the annular grooves 40. Furthermore, the latch member 72 has a convex leading edge residing in a plane transverse to the longitudinal axis of the lock canister 70, so that the latch member 72 is substantially flush with or below the outer surface of the lock canister 70 when retracted. Although it can be rigidly attached in a number of conventional ways, the lock assembly 32 is preferably press fitted into the first bore 52 so as to be frictionally secured to the button body 30. An optional tamper-proof set screw or nonremovable pin can be utilized.

A screw 63 detachably mounts in the body 30 and extends toward the reduced diameter portion 47 of the coupling member 28 in the second bore 54 forwardly adjacent the shoulder 46. The screw 63 extends through a hole 65 and is adjustable so as to selectively protrude radially into the second bore 54. Thus, the screw 63 prevents the body 30 from being pulled axially from the coupling member 28 because the shoulder 46 cannot move past the protruding screw 63.

To initially install the lockable button or anti-theft device of this invention, the user first removes any existing conventional button from the valve stem 20. Then the user places the coupling member 28 on the valve stem 20 as shown in FIG. 2, and rotates the coupling member clockwise until the first end 42 abuts or engages the shoulder 24 (FIG. 3). The user can install the optional set screw 50 to prevent the coupling 28 from being loosened. Preferably the factory supplies the button body 30 with the lock assembly 32 already press fitted into the bore 52. The user turns the key 74 clockwise to lower or retract the latch member 72, then installs the button body 30 on the coupling member 28. The user pushes the coupling member 28 into the bore 54 until the latch member 72 registers with one of the grooves 40. The user turns the key 74 counter-clockwise to extend the latch member 72 and lock the button body 30 in a given position on the coupling member 28 and the valve stem 20.

Figure 4:
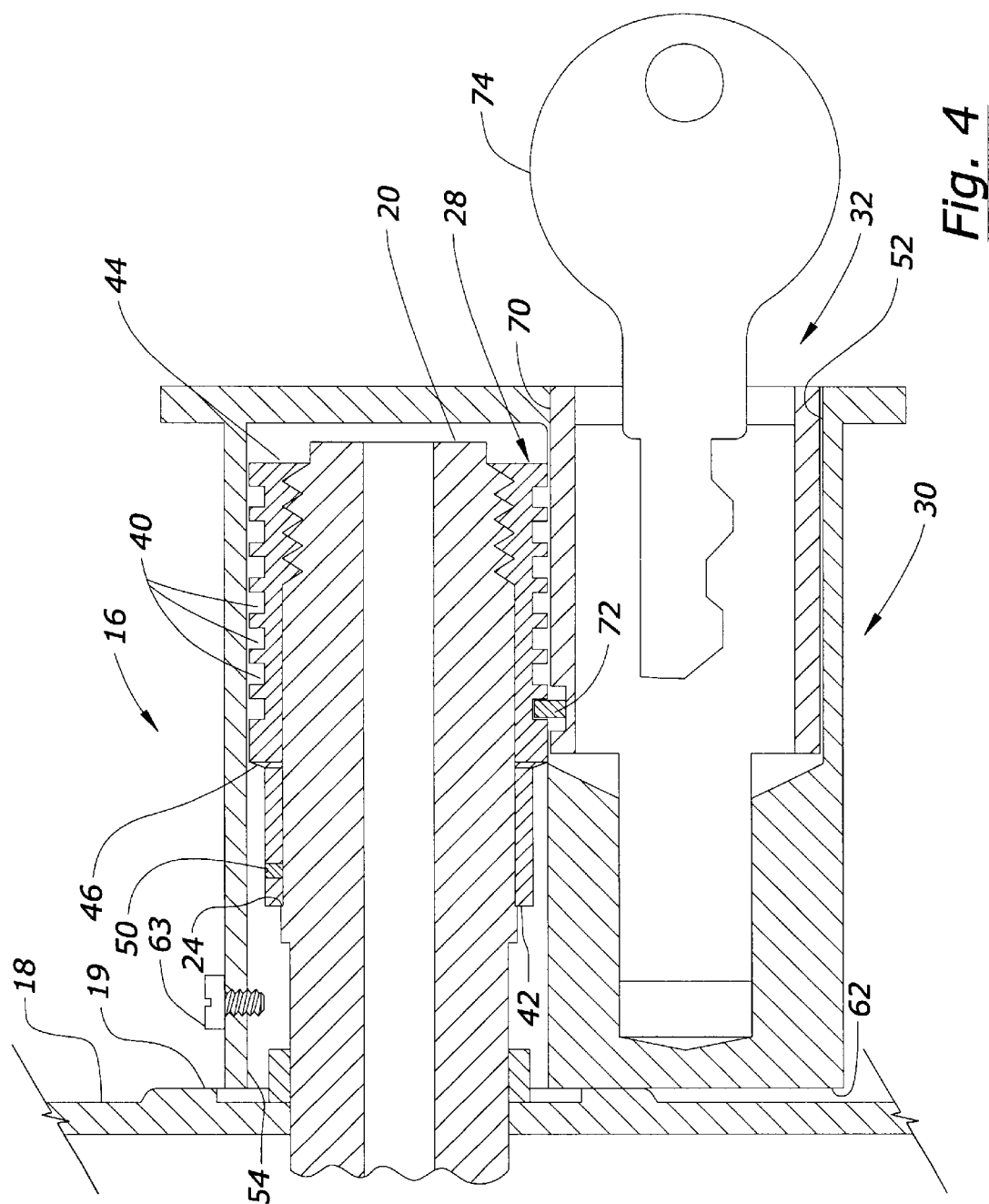
FIG. 4 is a cross-sectional view similar to FIG. 3, but shows the lockable button device in an anti-theft position in which the air brakes are locked so the vehicle cannot be moved.

FIGS. 3 and 4 illustrate that due to the plurality of grooves 40, the button body 30 locks in a number of different positions on the coupling member 28 and the valve stem 20. In FIG. 3, the latch member 72 of the lock assembly 32 fits into one of the grooves 40 that is closer to the rearward end 44 of the coupling member 28. The end 62 of the button body 30 does not abut or engage the raised pad 19 of the faceplate 18 when it is locked to the coupling member 28 in this manner. A gap exists between the button body 30 and the faceplate 18. Thus, the button 16 is in a regular or normal use position wherein the valve stem 20 can be pushed or pulled as needed to release or apply the brakes.

In FIG. 4, the user has turned the key 74 clockwise and pushed the button body 30 forward on the coupling member 28 until the end 62 abuts or nearly abuts the pad 19 on the faceplate 18. The driver turns the key 74, counter-clockwise to extend the latch member 72 into the nearest groove 40 and lock the body 30 to the coupling member 28 and the valve stem 20. A significant gap no longer exists between the end 62 of the button body 30 and the faceplate 18. Thus, thieves cannot push the valve stem 20 in to release the air brakes and steal the vehicle.

Figure 4A:
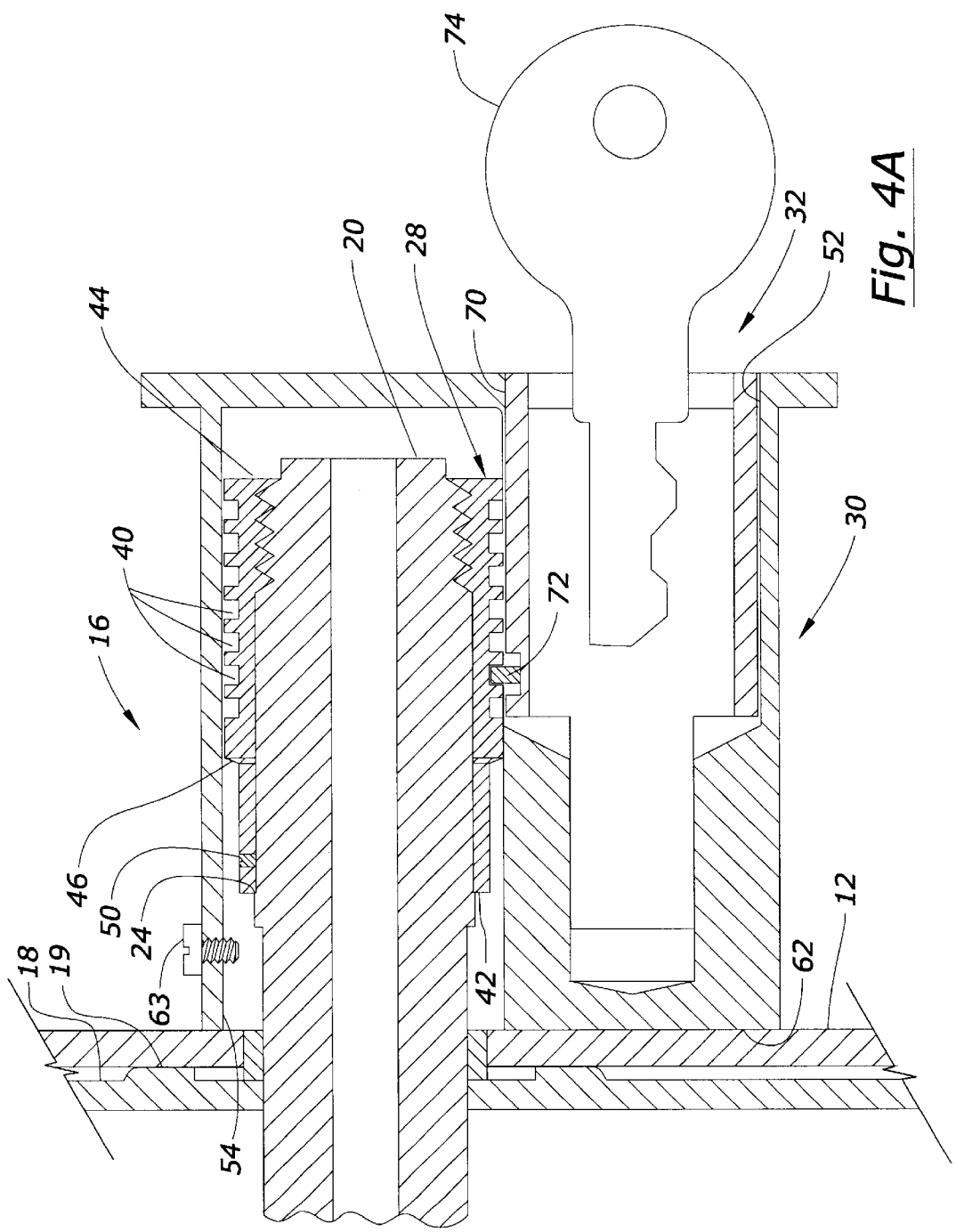
FIG. 4A is similar to FIG. 4, but shows another possible anti-theft position of the invention for use when the control valve is mounted behind the dashboard.

FIG. 4A shows another possible position of the button body 30, which is useful when the control valve 10 is mounted behind the dashboard 12. The driver again locks the button body 30 in one of the grooves 40 so as to substantially eliminate any gap between the body 30 and the dashboard 12. This prevents the valve stem 20 from being pushed in to release the brakes.

Figure 5:
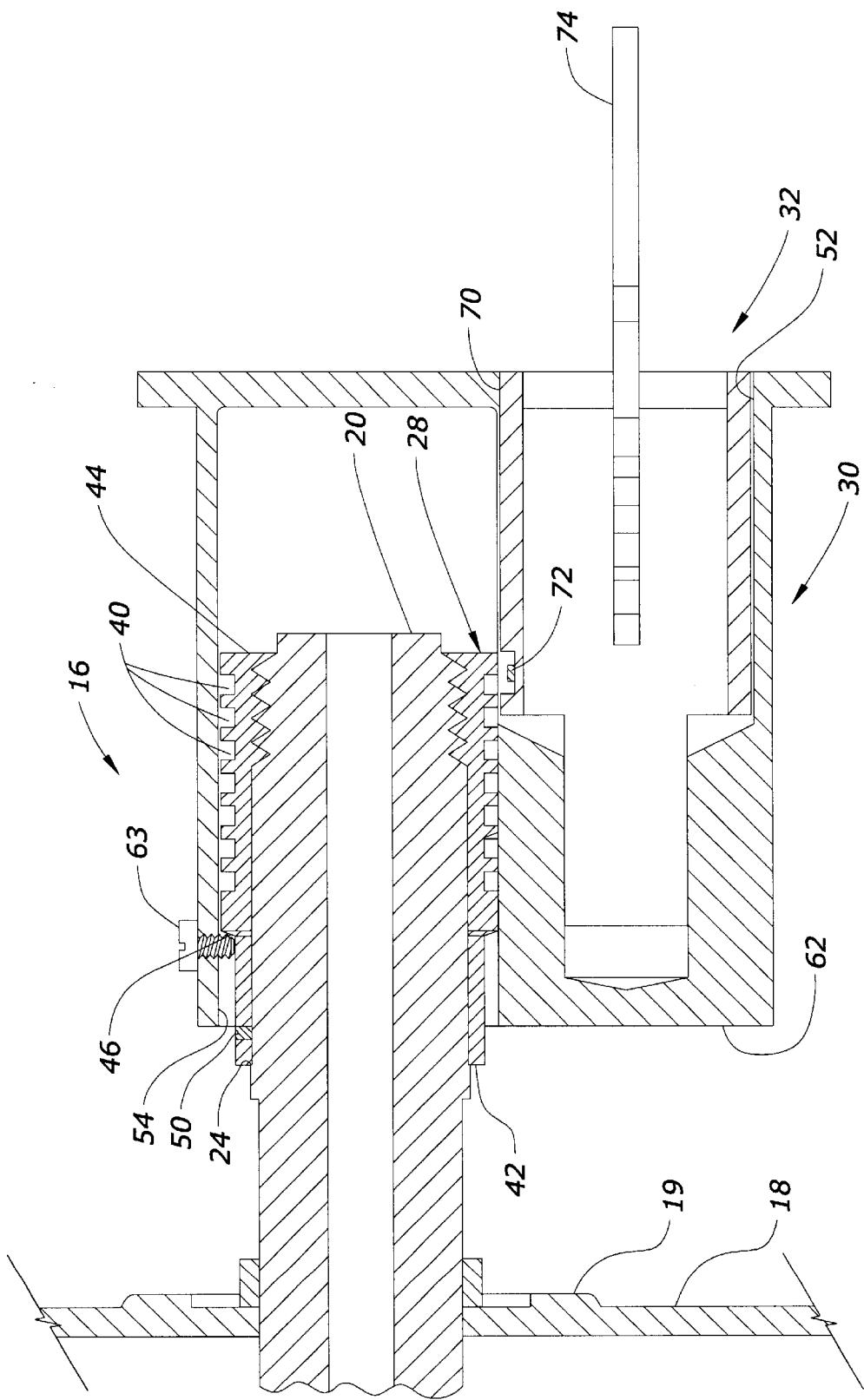
FIG. 5 is similar to FIG. 3, but shows an optional means for preventing inadvertent removal of the button body of this invention.

The grooves 40 on the coupling member 28 are wider than the latch member 72 and are sized and spaced longitudinally along the coupling member 28 so that the device 16 is adaptable to various control valves 10 and control valve mounting arrangements in different makes and models of trucks. Once the button body 30 is in the desired position, the user installs the screw 63 in the hole 65 to retain the button body 30 on the coupling member 28 regardless of whether the latch member 72 of the lock assembly 32 is extended or retracted, i.e.—locked or unlocked. As best seen in FIG. 5, this prevents the inadvertent removal of the button body when it is unlocked. Another unique feature of this invention is that once installed on the coupling member 28, the button body 30 can still be rotated. The annular grooves 40 allow rotation of the button body 30 when the latch member 72 is disposed in one of the grooves 40, and the button body 30 also freely rotates when the latch member 72 is retracted.

With the lockable button device 16 installed, thieves cannot push the valve stem 20 in to release the air brakes. Thus, the vehicle cannot be moved unless the lockable button devices 14 and 16 are released with appropriate keys 74. An authorized user can use the key 74 to unlock the button body 30 and pull it back. The user reverses the direction of the key 74 to raise the latch member 72 into another groove 40 closer to the rearward end 44 of the coupling member 28. The button body 30 will then be movable axially in both directions like a conventional button.

Thus, the present invention at least satisfies its stated objectives.

In the drawings and specifications, there has been set forth a preferred embodiment invention, and although specific terms are employed, these are used in a generic and descriptive sense only and not for purposes of limitation. Changes in the form and proportion of parts as well as in the substitution of equivalents are contemplated as circumstances may suggest or render expedient without departing from the scope of the invention as defined in the following claims.

What is claimed is:

1. A lockable button device for an brake control valve on a vehicle comprising:
   a lock assembly including an elongated lock canister and a latch member selectively movable in a transverse direction with respect to the lock canister;
   a coupling member including an outer surface having at least one annular groove thereon and further including fastening means for securing the coupling member to move axially with an axially movable valve stem of the air brake control valve;
   a button body having elongated first and second bores therein adapted to receive the lock assembly and the coupling member respectively, the first and second bores each having a different central longitudinal axis, the button body having an internal cavity connecting the first and second bores so as to permit the latch member to be selectively moved into latching engagement in the groove on the coupling member.

2. The device of claim 1 wherein the coupling member is a hollow tubular sleeve having an outer diameter defining the outer surface and an inner diameter adapted to receive an axially movable valve stem of the air brake valve.

3. The device of claim 2 wherein the fastening means includes threads formed on the inner diameter of the coupling member.

4. The device of claim 2 wherein the fastening means includes a hole extending radially into the inner diameter of the coupling member from the outer surface thereof and a pin member adapted to be inserted into the hole so as to engage the valve stem.

5. The device of claim 4 wherein the hole and the pin member are threaded with mating threads.

6. The device of claim 1 wherein the coupling member has opposite forward and rearward ends and a shoulder thereon formed between the forward end and the groove.

7. The device of claim 6 comprising a screw detachably mounted in the body and extending toward the coupling member in the second bore forwardly adjacent the shoulder, the screw being adjustable so as to selectively protrude inwardly into the second bore sufficiently to be in a position to abut a forward edge of the shoulder and thereby prevent the body from being pulled axially off of the coupling member.

8. The device of claim 1 wherein the latch member is extensible and retractable in a radial direction with respect to the lock canister.

9. The device of claim 1 wherein the central longitudinal axis of the first bore is parallel to the central longitudinal axis of the second bore.

10. The device of claim 1 wherein the first bore has an entrance at a first end of the body and the second bore has an entrance at a second end of the body.

11. The device of claim 10 wherein the first and second bores are closed ended cylindrical bores.

12. The device of claim 1 wherein the button body comprises a substantially cylindrical main body portion and a head portion that is enlarged with respect to the main body portion.

13. The device of claim 1 wherein the at least one groove comprises a plurality of annular grooves longitudinally spaced along the outer diameter of the coupling member such that the button body is latchable in one of a plurality of positions longitudinally with respect to the coupling member.

14. The device of claim 1 wherein the internal cavity is a substantially rectangular slot.

15. The device of claim 1 wherein the lock assembly is press fitted into first bore so as to be frictionally scoured to the button body.

16. The device of claim 1 wherein the lock assembly is a key lock assembly.

17. An anti-theft device for an air brake control valve on a vehicle comprising:
   a hollow tubular coupling member including an outer surface having an annular groove thereon and further including fastening means for securing the coupling member to move axially with an axially movable valve stem of the air brake control valve;
   a button body having a coupling bore therein far receiving at least a portion of the outer surface of the coupling member such that the annular groove resides in the button body;
   said button body being adapted to remain on said air brake control valve during the operation of the vehicle;
   a lock assembly mounted in the button body, the lock assembly including a movable latch member thereon arranged to engage the groove to limit axial movement of the button body relative to the coupling member.

18. The device of claim 17 wherein the coupling member has opposite forward and rearward ends and a fixed length and wherein the coupling bore has a depth that is greater than the length of the coupling member, the latch member of the lock assembly being positioned in the button body such that when the latch member engages one of the grooves in the coupling member the button body houses the rearward end of the coupling member and protrudes axially beyond the forward end of the coupling member.

19. A device for locking an air brake control valve in a vehicle, the valve including a push/pull stem, the device comprising:
   a coupler mounted on the valve stem;
   a button slidably mounted on the coupler and being selectively fixed to the coupler in a locked position to prevent actuation of the brake system and a unlocked position allowing actuation of the valve stem; and
   a lock cylinder in the button for controlling the position of the button on the coupler.

20. The device of claim 19, wherein the coupler has first and second grooves and the lock cylinder has a latch member adapted to be received in the grooves, the first groove corresponding to the locked position of the button and the second groove corresponding to the unlocked position of the button.

* * * * *